June 12, 1928.
E. G. LOOMIS
1,673,085
VACUUM MIXING MACHINE
Filed Aug. 4, 1926    4 Sheets-Sheet 1
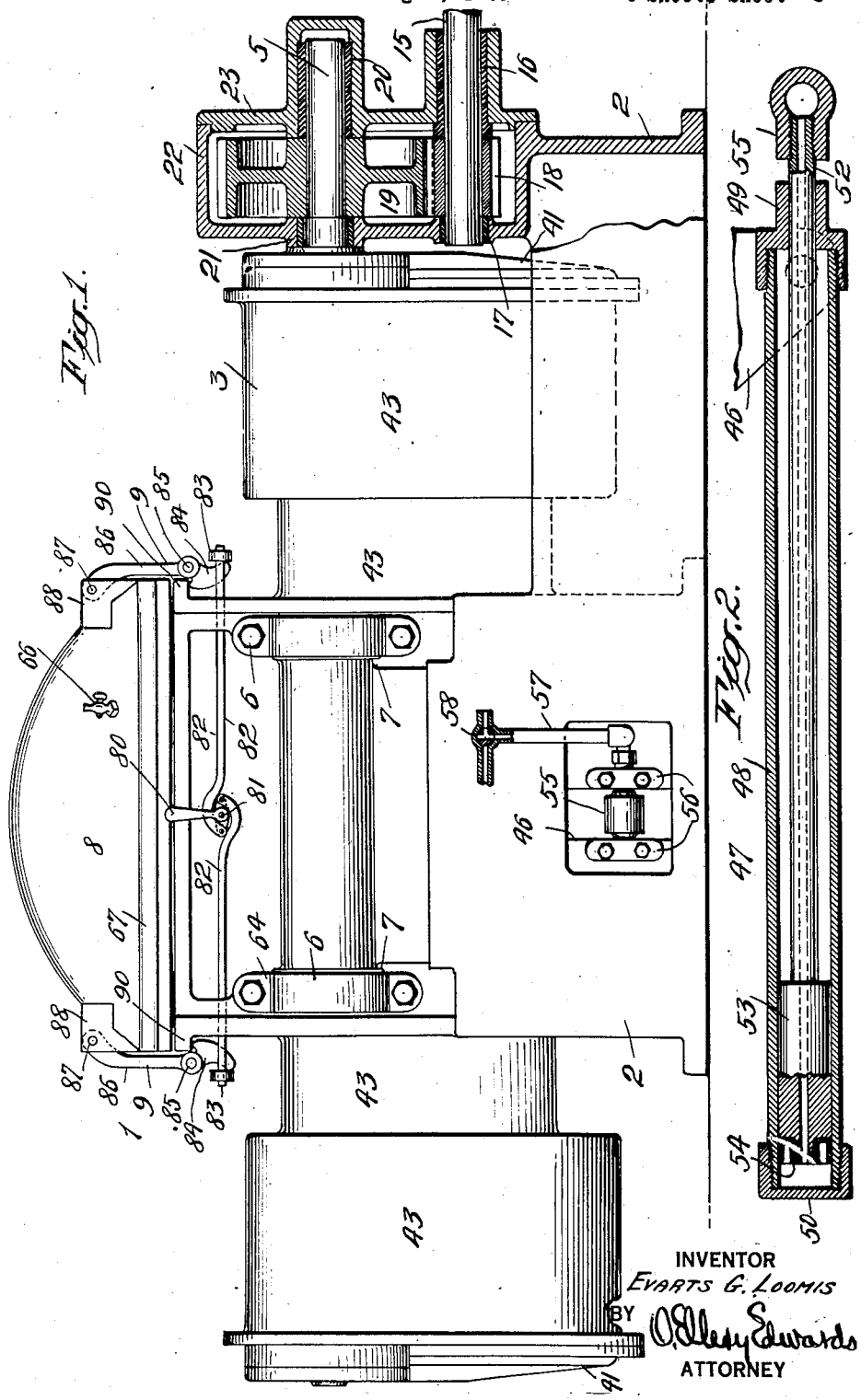
INVENTOR
EVARTS G. LOOMIS
BY
O'Leary Edwards
ATTORNEY

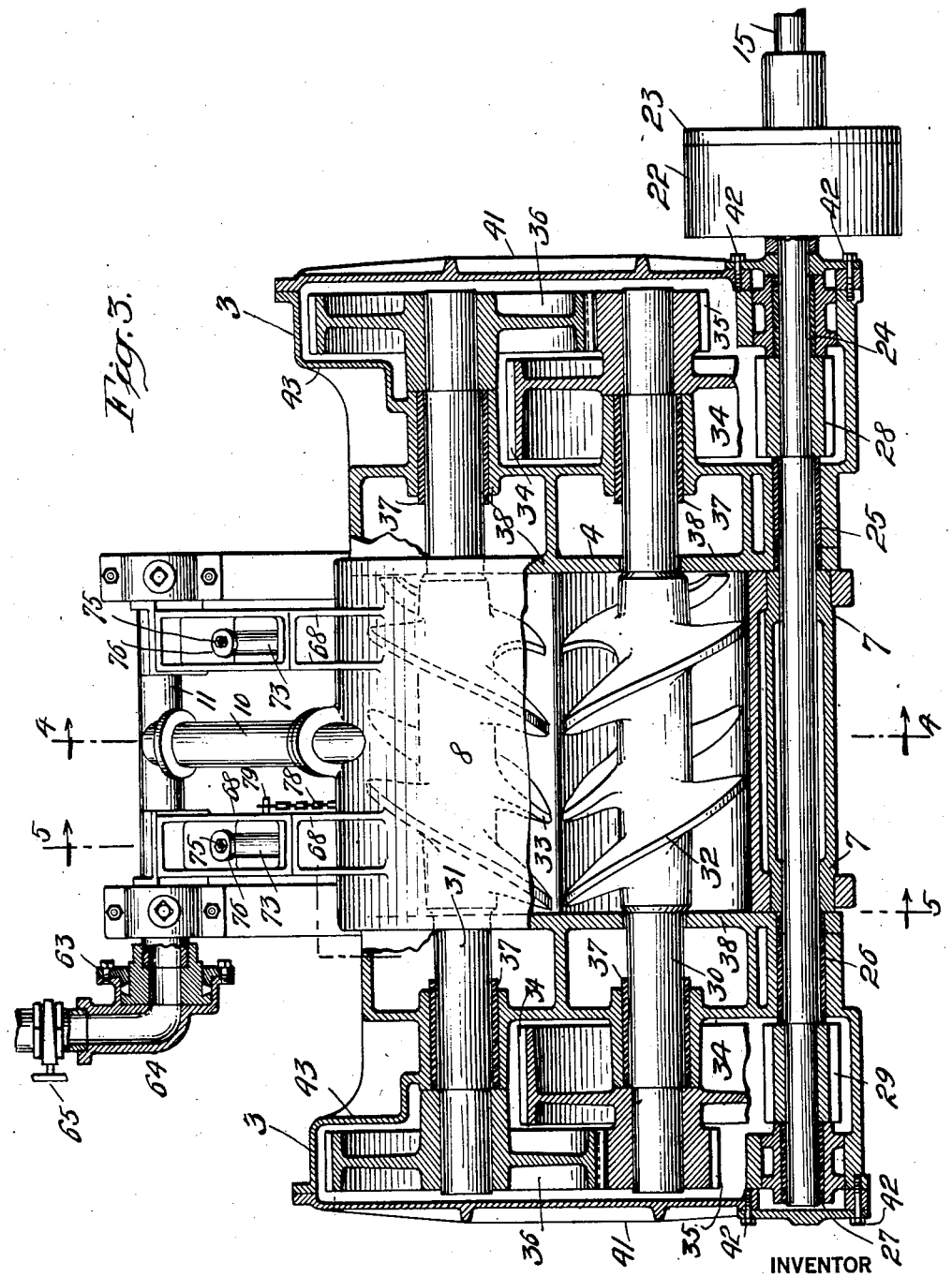

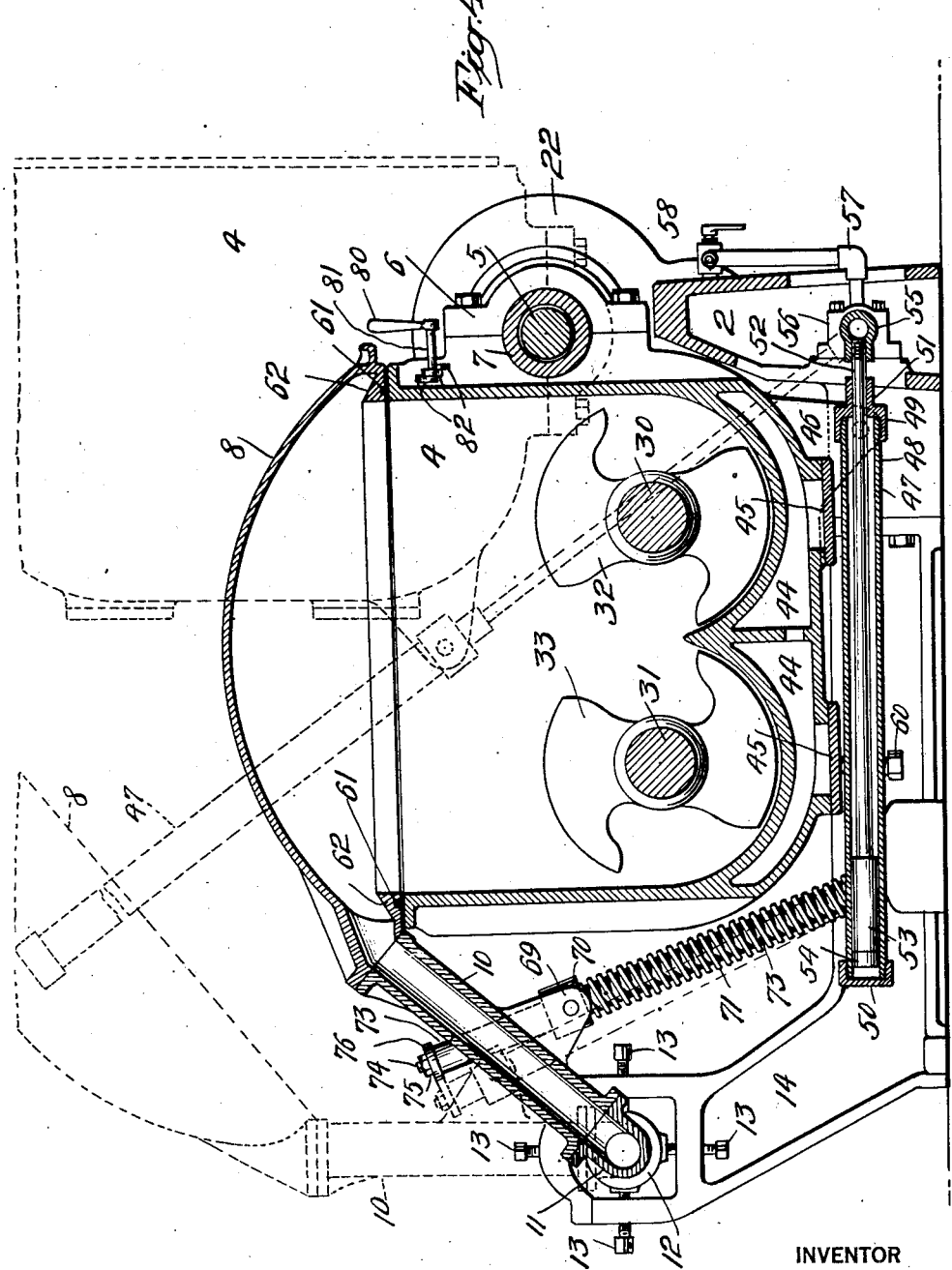

June 12, 1928. 1,673,085
E. G. LOOMIS
VACUUM MIXING MACHINE
Filed Aug. 4, 1926 4 Sheets-Sheet 4
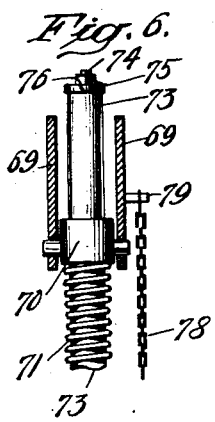
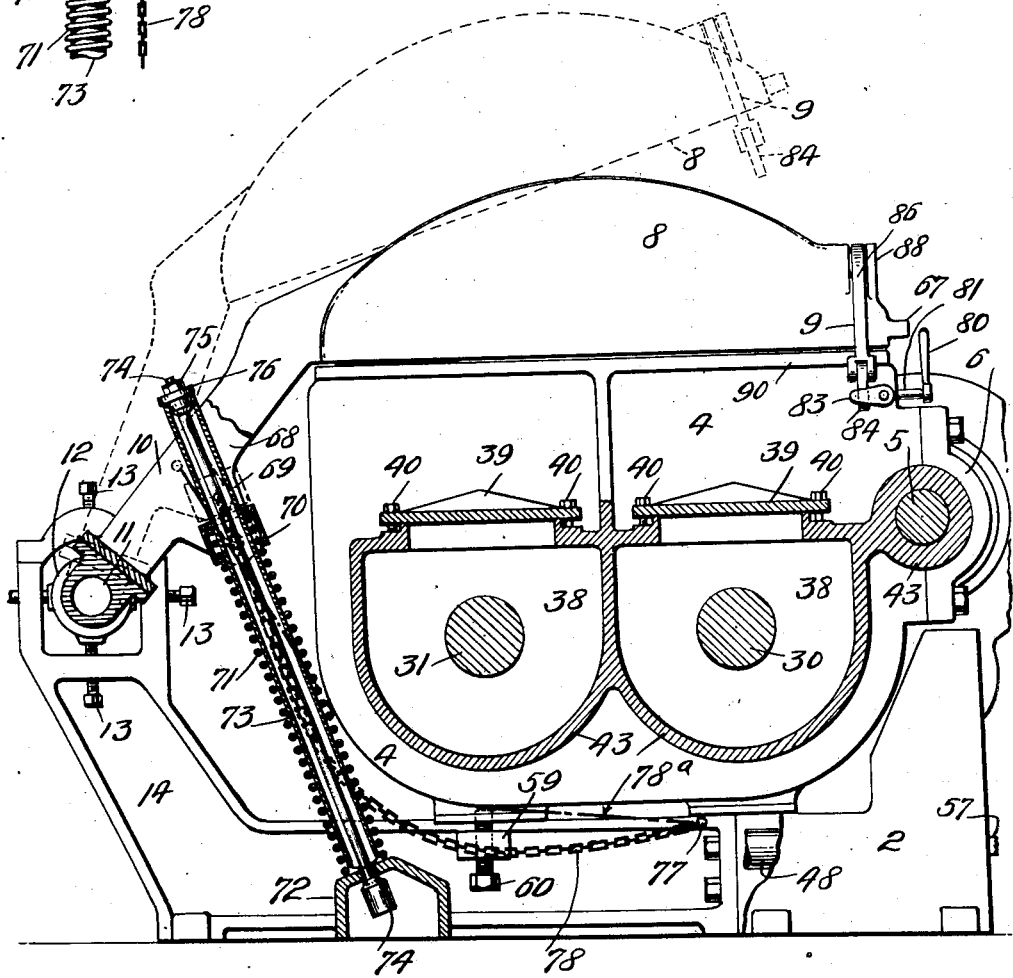
INVENTOR
EVARTS G. LOOMIS
BY
ATTORNEY Patented June 12, 1928.

1,673,085

UNITED STATES PATENT OFFICE.

EVARTS G. LOOMIS, OF NEWARK, NEW JERSEY.

VACUUM MIXING MACHINE.

Application filed August 4, 1926. Serial No. 126,948.

The object of my invention is to provide a machine suitable for mixing any materials with one or more volatile constituents, the content of which it is desired to reduce. In many cases these volatile substances are solvents which are added purposely to soften the mass and make it more readily workable. After these solvents have served this purpose, it is generally desirable to remove and recover them so that they may be used again. In other cases these volatiles are naturally found in the material or are added in previous processes. The purpose of this invention is to provide a machine which will furnish means for mixing or agitating the material and at the same time to reduce the pressure in the working space in the machine below that of the atmosphere so as to lower the boiling or vaporizing point of the volatile substances and by means of vacuum connections, to remove them from the machine. This and other objects are accomplished by my invention, one embodiment of which is hereinafter more particularly set forth.

For a more detailed description of my invention, reference is to be had to the accompanying drawings, forming a part hereof, in which Figure 1 is a front elevation of my improved mixing machine, a portion being shown in section to more clearly reveal the structure.

Figure 2 is a sectional view showing a ram which is used to elevate the mixing chamber.

Figure 3 is a plan view, mostly in section, of my machine.

Figure 4 is a transverse section of my improved machine, the elevated positions of the cover and mixing chamber being shown in dotted lines, the section being taken on the line 4—4 of Figure 3, looking in the direction of the arrows.

Figure 5 is another transverse section taken substantially on the line 5—5 of Figure 3, looking in the direction of the arrows.

Figure 6 is a sectional view showing a detail of the cover counter balancing mechanism.

Throughout the various views of the drawings, similar reference characters designate similar parts.

My improved vacuum mixing machine 1 is provided with a supporting base or frame 2 which is fixed and a swinging frame 3 which carries most of the gears, shafting and mixing chamber 4 and the contents thereof, as will appear below. The frame 3 is pivoted about the axis of the main shaft 5 and the mixing chamber has bearings 6 that turn on trunnions 7 that are fixedly connected to the base 2. There is also a cover 8 which is held at its front by means of suitable fasteners 9 and at its rear by means of a tube 10 which is fixed to a horizontal pipe 11 that turns in bearings 12 which are supported by adjusting screws 13 which are in turn supported by brackets 14 which form an integral part of the frame 2.

Power for the mixing blades of the machine is derived from a shaft 15 which is driven by any suitable means, not shown, and this shaft turns in bearings 16 and 17 in the frame 2 and carries a pinion 18 which meshes with a corresponding pinion 19 which is fixed to the main shaft 5 of the machine. The main shaft 5 has bearings 20 and 21 in the frame 2 and the bears 18 and 19 are concealed by a suitable housing 22 which forms an integral part of the frame 2. A cover 23 of this housing contains the bearings 20 and 16 above described. This cover is secured to the housing in any suitable manner, as by screws or bolts, not shown. A movable frame 3, as shown in Figure 3, has a number of bearings on this shaft 5, as indicated by the characters 24, 25, 26 and 27 and also two pinions 28 and 29 which are also in the movable frame 3. This shaft also passes through the trunnions 7 which form an integral part of the fixed frame 2, as above set forth.

The pinions 28 and 29 drive their respective trains of gearing which are at opposite ends of the shafts 30 and 31. These shafts carry the mixing blades or paddles 32 and 33 which are preferably made and mounted in the conventional manner.

The trains of gearing for driving these blades and their shafts 30 and 31 will now be described. The shaft 30 carries two pinions at each end, a larger pinion 34 which meshes with the pinion 28 or the pinion 29, and a smaller pinion 35 which meshes with pinions 36 which are fixed at each end of the shaft 31. It is essential that these trains of gears 34, 35 and 36 should be identical, but it is not essential that the shafts 30 and 31 have the same angular velocity and they may be given any desired angular velocity, according to the design of the gears. The shafts 30 and 31 are mounted in suitable bearings 37 in the movable frame 3 and these bearings are separated from the end walls 38 of the mixing chamber 4 so that any materials which may escape from this mixing chamber will not get to the bearings 37 and any grease, or other material, which may escape from the bearings 37 will not get to the interior of the mixing chamber. Covers 39 are provided so that access may be had to the chamber, just above described, and these covers are held in place by suitable bolts 40, in the conventional manner.

The movable frame 3 has end covers 41 held in place by suitable bolts 42, in the conventional manner, so that the gears 34, 35 and 36 are protected and concealed, the frame 3 having suitable extensions 43 for this purpose.

Sometimes it is desirable to cool or heat the material which is being operated on by the paddles 32 and 33 and when this is the case, steam may be admitted by any suitable means, no shown, to the chambers 44 which are shown in Figure 4 and are under the mixing chamber in which these blades 32 and 33 revolve, as above described. Suitable hand holes with covers 45, of the conventional kind, are provided to permit access to these chambers 44.

The bottom of the mixing chamber 4 is also provided with two downwardly extending ears 46 which have a pivotal connection with a ram 47. This ram 47 has a cylinder 48 which at one end is closed by a cylinder head 49 and at the other by a cylinder head 50. The cylinder head 50 is preferably made in the form of an ordinary screw cap and the cylinder head 49 is preferably made in the form of a similar cap with a perforated extension 51 through which passes a hollow piston rod 52. This hollow piston rod carries a piston 53 which is also hollow and has a U packing 54, of the conventional kind, at the end near the cylinder head 50. The other end of the piston rod 52 is provided with a coupling 55 which is pivotally mounted and to which it is connected with a fluid tight joint and this coupling is mounted in suitable bearings 56 set in the frame 2. It is connected to a pipe 57 under which fluid flows when under pressure subject to the control of a suitable hand valve 58 which is placed at any convenient location. It is preferably a three-way valve which may be used either to admit pressure to the interior of the piston 52 or to open the interior of this piston to the atmosphere, as desired, so that by simply turning the valve 58 it is possible to operate the ram. When the ram operates the cylinder 48 slides on the piston 53 and separates the ears 46 from the coupling 55 so that the mixing chamber 4 and its attached parts may be lifted to the position shown by dotted lines in Figure 4 for dumping or for loading, this mixing chamber being thrown on the trunnion 7, as a pivot. When pressure is released, by opening the interior of the piston 53 and piston rod 52 to the atmosphere, the weight of the mixing chamber is sufficient to cause it to return to its normal position shown in full lines in Figure 4.

For the purpose of getting the mixing chamber in the right position when lowered, it is preferable to provide the frame 2 with an ear 59 in which is mounted a set screw 60 by which the requisite adjustment may be had. It is desirable that the top of the mixing chamber 4 should not be leveled, but that it should slope gently from the front to the rear of the machine for a purpose which will be described below.

The top of the mixing chamber 4 is preferably made smooth, although it may be made in any desirable way and it is engaged by a packing 61 secured to the bottom of the cover 8. The lower edge of this cover 8 is preferably made, as shown in Figure 4, so as to provide a gutter 62 extending about its lower edge and on the interior thereof and to the tube 10 through which this cover is pivoted, as above described, and the position of the set screw 60 is such that this gutter 62 is inclined from the front to the rear so that all liquid which condenses on the interior of the cover 8 will be held by capillary attraction to the under side of the cover and thence be drawn by gravity to the gutter 62 which, because it is inclined as above stated, will drain into the tube 10 and from thence to the pipe 11 and from there through the coupling 63 to the fixed pipe 64 and thence through the valve 65 to the exhaust apparatus which is not shown.

It is desirable that the cover 8 rises whenever the catch 9 is released and it is evident that it cannot rise as long as there is a partial vacuum in the mixing chamber 4. To overcome this partial vacuum with facility, a relief valve 66 is placed at any convenient location and near the handle of the catch 9. When this relief valve is open to atmosphere and the catch 9 released, the cover will rise automatically because of the over-balancing mechanism which will now be described. When the reverse operation occurs and the cover is lowered, it is controlled through the handle 67 which is grasped by the operator and by using a little force, he overcomes the counter-balancing mechanism and lowers the cover and thereafter secures the same by locking the catch 9 in a manner which will be described below.

The counter-balancing mechanism will now be described. The pipe 11 is connected to the cover 8 not only by the tube 10, but also by suitable webs 68 which have suitable ears 69 extending therefrom which are pivotally connected with spring caps 70. The spring caps 70 surmount suitable coil springs 71 that run to a suitable fixed support 72 which is a part of the base 2. These springs 71 surround a suitable tube 73 which also rests on this base 72 and passes through the spring cap 70 with a sliding fit. A holding bolt 74 for each tube passes through a suitable perforation in the base 72 and through each tube to its top and each bolt is provided with a cap 76 which rests on top of its tube 73 and a nut 75 for holding the cap in place. The strength of said springs 71 is such that they over-balance the weight of the cover 8 when in its lowered position and as the cover rises and the springs 71 elongate, the tension of these springs lessens so as to correspond with the reduced stress on these springs due to the approach of the center of gravity of the cover 8 to the position of balance.

It is obvious that the upward movement of the cover 8 should be limited so that it will not go too far and it is limited in the following manner. The frame 2 carries a lug or other means 77 to which a chain 78 is attached and the other end of this chain 78 is secured to a corresponding lug 79 on an ear 69 (see Figure 6). This chain is long enough to allow the cover 8 to rest to substantially the position shown in dotted lines and when this occurs this chain will rest snug against the bottom of the mixing chamber 4, as indicated by the broken line 78ᵃ in Figure 5. When the ram 47 is actuated, as above described, so as to raise the mixing chamber 4, the cover can rise until it reaches the position indicated in Figure 4 and remain there until the mixing chamber 4 is dumped and reloaded. Thereafter, when the mixing chamber 14 is lowered it again engages the chain 78 so as to pull the cover down until the cover assumes the position shown in dotted lines in Figure 5 and thereafter it may be further lowered by the operator who grasps the handle 67 which has been described above. By adjusting the set screws 12 which govern the position of the bearing 11 it is possible to get an adjustment which enables the cover and mixing chamber to function, as above described.

The catch 9, which has been referred to above, has novel features which will now be described, beginning with the handle 80 which is pivoted at 81 on the exterior of the mixer 4. This handle has two laterally extending ears which are pivotally connected to the bolts 82, which extend laterally in each direction and through suitable perforations in the exterior flanges of the mixing chamber and terminate in two laterally extending heads 83. These heads engage pivotally mounted dogs 84 which are shaped substantially as shown, so that they will swing on their respective pivots 85 and these pivots are placed in the lower ends of the catches 86 which, at their upper ends, are pivoted at 87 between integral ears 88 that extend from the top of the cover 8. When released, the dogs 84 by their own weight will swing free of the laterally extending top flanges 90 of the mixing chamber 4. When the handle is thrown into the position shown in Figure 1, these dogs are thrown under these flanges and thereby lock the cover 8 in place.

*Operation.*

In view of the foregoing, the operation of my improved mixer will be readily understood. Assuming that the valve 65 is closed and the cover raised to the position shown in Figure 5 or to the position shown in Figure 4, as may be convenient, the mixing chamber is loaded, and if necessary, lowered to the position shown in full lines in Figure 4. The cover is then lowered and locked in place and then the valve 65 is opened and the exhaust applied and also the blades 32 and 33 are set in motion, in the conventional manner, thereby kneading the dough or working the mass in the mixing chamber and stirring it so that its volatile contents may escape. If necessary, heat is applied in the chambers 44, in the conventional manner, and in any event, the mass in the mixer is thoroughly worked and its volatile products expelled. This is continued until the mass has been sufficiently worked and exhausted and thereafter the blades may be stopped, the valve 65 closed, the valve 66 opened until atmospheric pressure exists in the mixer and then closed and thereafter the handle 80 may be thrown so as to open the catch 9 after which the cover 8 will rise automatically, as above described. After it has risen sufficiently, the valve 58 may be manipulated so as to cause the mixing chamber to be thrown, as indicated by dotted lines in Figure 4, as above described, and thereafter it may be dumped and cleaned and reloaded and lowered, or it may be lowered and then reloaded, as desired, and thereafter the cover can be lowered and the above cycle of operations may be repeated. If, during the working process of the material in the mixing chamber, any volatile products escape which condense on the cover 8, they will run along the interior of the cover, as above set forth and into the gutter 62 and thence run out through the pipes 10 and 11, as above set forth.

While I have shown and described one embodiment of my invention, it is obvious that it is not restricted thereto, but that it is broad enough to cover all structures that come within the scope of the annexed claims.

Having thus described my invention, what I claim is:

1. In a machine of the class described, a mixing chamber, means for agitating material in said chamber, a cover provided with a gutter for carrying away from said mixing chamber condensed vapors from inner surface of said cover.

2. In a machine of the class described, a mixing chamber, means for agitating material in said chamber, a cover adapted to close the same, said cover being provided with a gutter around its inner edge arranged to catch the condensed vapors on inner surface of said cover and to drain such condensate away from said mixing chamber.

3. In a machine of the class described, a mixing chamber, means for agitating material in said chamber, a cover provided with a gutter for carrying away from said mixing chamber condensed vapors from inner surface of said cover, said gutter connecting with a drain communicating with a vacuum system.

4. In a machine of the class described, a mixing chamber, means for agitating material in said chamber, a cover adapted to fit over said mixing chamber with a fluid tight joint, and provided with a connection to a vacuum system, means for draining inner surface of said cover into same vacuum system.

5. In a machine of the class described, a fixed frame, a mixing chamber mounted on said frame, means for agitating material in said chamber, a cover pivoted on said frame and designed to swing upwardly to allow access to said chamber and downwardly to make a fluid tight joint on upper rim of said chamber, the first member of said cover being provided with a tubular passage, said tubular passage serving as a connection between said chamber and a vacuum system and also serving as a drain from under surface of cover to lead any condensed vapors away from said mixing chamber.

6. In a machine of the class described, comprising a frame, a mixing chamber pivotally mounted on said frame, means for agitating material in said chamber, a cover adapted to fit on said mixing chamber with a fluid tight joint, said cover being rigidly secured to a hollow hinge member, which may be rotated in bearings secured to the main frame, and which allows said cover to be swung up and away from the mixing chamber, said hollow hinge member being connected to a vacuum system by means of a swivel joint and serving as a pipe connection to the interior of the mixing chamber.

7. In a machine of the class described, a mixing chamber with a cover mounted thereon, means for exhausting said chamber through said cover and a gutter in said cover draining into the passage through which the chamber is exhausted.

8. In a machine of the class described, a fixed frame and a movable frame containing a mixing chamber, paddles and driving mechanism for the paddles, a cover adapted to close the mixing chamber and means for pivotally connecting the cover and the fixed frame, means for securing the cover in place with a fluid tight joint, counter-balancing means for raising the cover when released by the holding means, means for limiting the upward movement of the cover, according to the position of the mixing chamber and a ram connected to the mixing chamber for raising the same to its dumping position.

9. In a machine of the class described, a mixing chamber, means for agitating material in said chamber, a pivotally mounted cover, the pivotal member being rigidly attached to the cover and of tubular section so as to serve also for a connection to the interior of said mixing chamber.

10. In a machine of the class described, a fixed frame, a mixing chamber, mounted thereon, a cover pivotally mounted by means of a hinge member on said fixed frame, and in its lower position, adapted to fit on upper rim of mixing chamber with a fluid tight joint, said hinge member being tubular in section and serving also as a connection to the interior of said mixing chamber.

11. In a machine of the class described, a fixed frame, a mixing chamber mounted thereon, a cover pivotally mounted by means of a hinge member on said fixed frame, and in its lower position, adapted to fit on upper rim of mixing chamber, with a fluid tight joint, said hinge member being tubular in section and through a swivel joint connecting the interior of the mixing chamber to a suitable vacuum system.

12. In a machine of the class described, a fixed frame, a mixing chamber mounted thereon, a cover pivotally mounted by means of a hinge member on said fixed frame, and in its lower position, adapted to fit on upper rim of mixing chamber with a fluid tight joint, said hinge member being tubular in section and serving also as a connection to the interior of said mixing chamber, said cover being provided with a gutter about its lower rim and said tubular hinge member being arranged also to serve as a drain for said gutter, to remove condensed vapors from the interior surface of the cover away from the mixing chamber.

13. In a machine of the class described, a fixed frame, a mixing chamber pivotally mounted thereon, and arranged to swing forwardly into a position for emptying, a cover pivotally mounted at rear of said frame and with the axis of the pivot below the normal upper surface of the mixing chamber, the pivot member being fixed to the cover and being provided with a tubular passage adapted to serve as a connection from the interior of the mixing chamber and also a drain for the condensation from the under surface of the cover.

14. In a machine of the class described, a fixed frame and a movable frame pivotally mounted thereon, a mixing chamber in said movable frame and gear chambers, paddles and paddle shafts passing through said mixing chamber and into the gear chambers, gears in the gear chambers connected to corresponding gears on the main shaft, means for tipping the mixing chamber about the pivoted axis, a cover pivotally connected with said fixed frame and adapted to fit on said mixing chamber with a fluid tight joint, means for securing said cover on said mixing chamber, means for draining condensed vapors from under surface of said cover away from said mixing chamber, means for raising said cover, and means for producing a partial vacuum in said mixing chamber when the cover is lowered.

In testimony whereof, I have hereunto set my hand and seal this 31st day of July, 1926.

EVARTS G. LOOMIS.